Nov. 13, 1951     O. STEINER     2,575,197
COLLAPSIBLE VIEW FINDER FOR PHOTOGRAPHIC CAMERAS
Filed May 1, 1947     3 Sheets-Sheet 1

INVENTOR.
OSCAR STEINER
BY
ATTYS.

Nov. 13, 1951     O. STEINER     2,575,197
COLLAPSIBLE VIEW FINDER FOR PHOTOGRAPHIC CAMERAS
Filed May 1, 1947     3 Sheets-Sheet 2
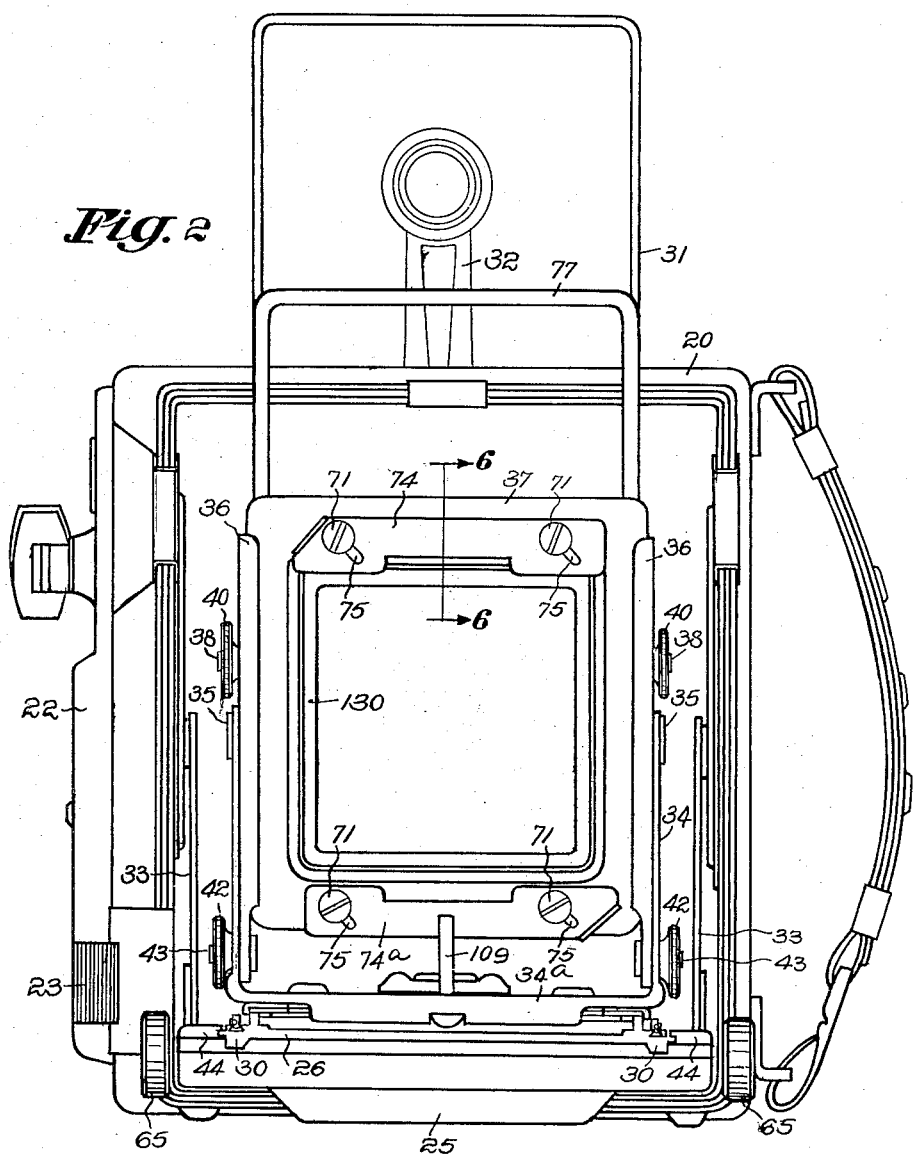
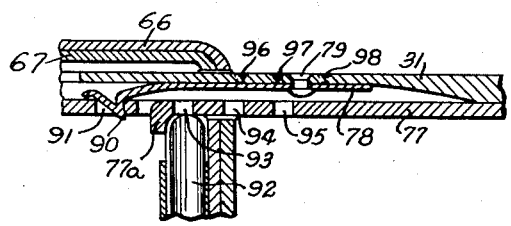
INVENTOR.
OSCAR STEINER.
BY
ATTYS Nov. 13, 1951     O. STEINER     2,575,197
COLLAPSIBLE VIEW FINDER FOR PHOTOGRAPHIC CAMERAS
Filed May 1, 1947     3 Sheets-Sheet 3
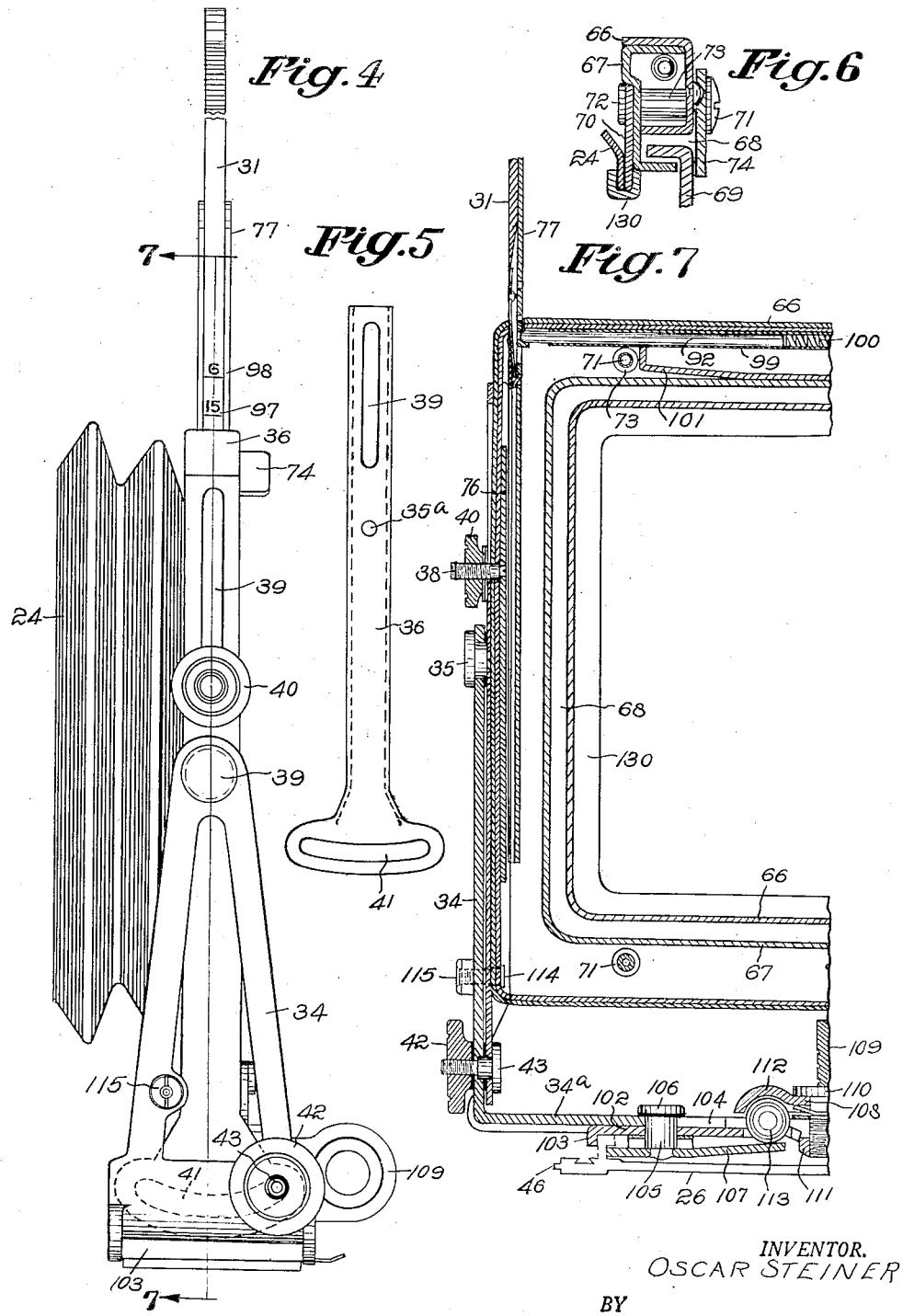
INVENTOR.
OSCAR STEINER
BY
ATTYS Patented Nov. 13, 1951

2,575,197

UNITED STATES PATENT OFFICE 2,575,197

COLLAPSIBLE VIEW FINDER FOR PHOTOGRAPHIC CAMERAS

Oscar Steiner, Rochester, N. Y., assignor to Graflex, Inc., Rochester, N. Y., a corporation of Delaware Application May 1, 1947, Serial No. 745,182

12 Claims. (Cl. 33—64)

This invention relates to a collapsible view finder for photographic cameras, particularly of the folding type.

In order that the principle of the invention may be readily understood, there is disclosed a single embodiment thereof in the accompanying drawings, wherein:

Fig. 2 is a front elevation of Fig. 1;

Fig. 3 is an enlarged detail of a portion of the construction shown in Fig. 7, to represent more clearly the construction of the detent for the collapsible view finder but turned ninety degrees from its actual position;

Fig. 4 is an enlarged detail in elevation of the camera front;

Fig. 5 is a detail on a reduced scale of one of the swing members;

Fig. 6 is a sectional detail through Fig. 2 on the line 6—6 thereof; and

Fig. 7 is a vertical section through Fig. 4 on the line 7—7 thereof.

Figure 1:
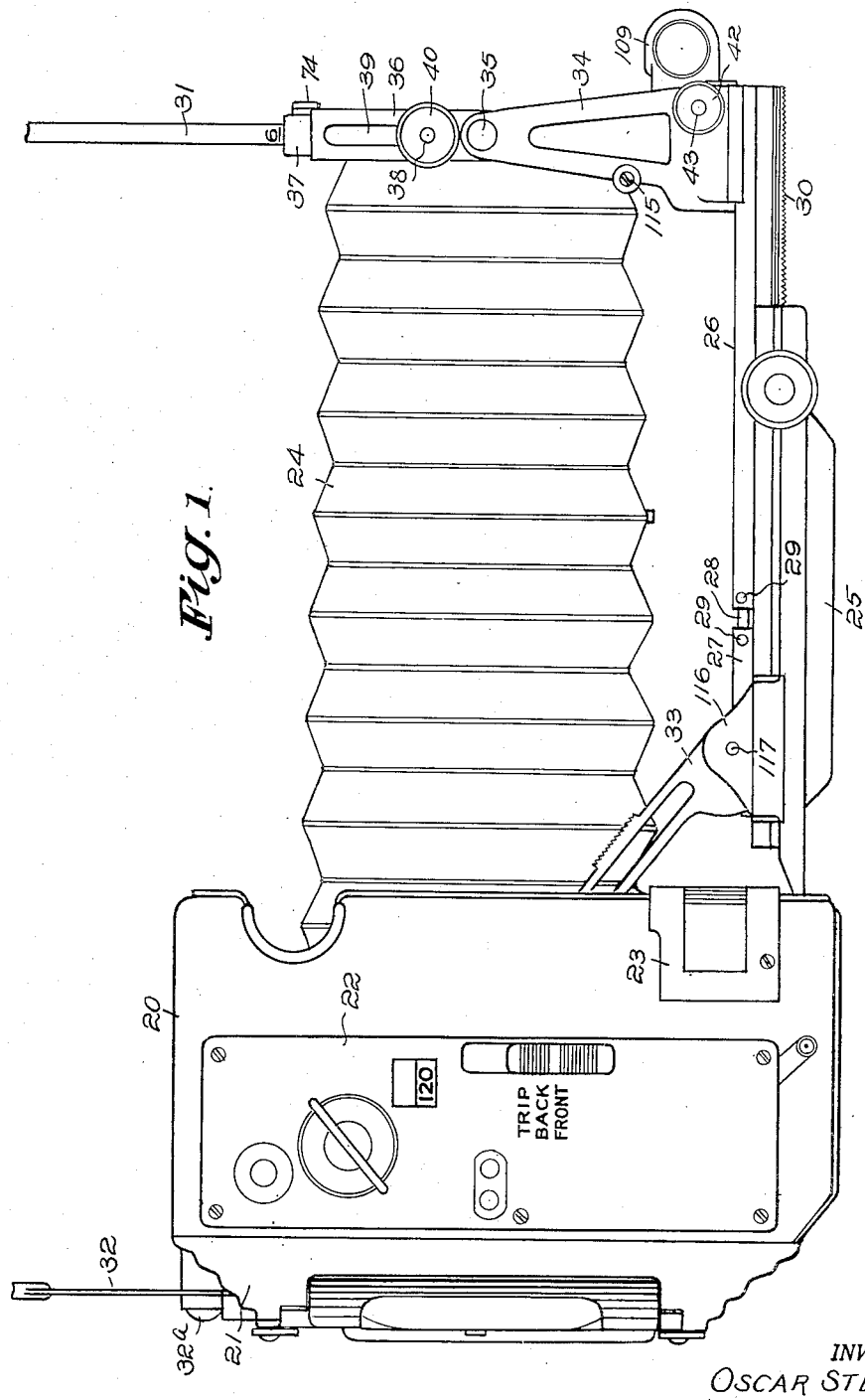
Fig. 1 is a right-hand side elevation of the camera showing it in open condition and the bellows fully extended.

While not limited to such type, the invention herein disclosed pertains to a folding camera of the character shown in the United States patents to Oscar Steiner, No. 2,233,354, February 25, 1941, No. 2,264,777, December 2, 1941 and No. 2,282,263, May 5, 1942.

The camera box of a folding type of camera is shown at 20, and upon it is mounted a camera back member 21, which need not be fully described herein. Attached to the camera box 20 is a shutter plate 22 which need not be described herein. The shutter release member is indicated at 23, the camera bellows at 24, the camera bed at 25, the camera front track at 26 and the camera rear track at 27.

The camera tracks 26 and 27 are tied together by means of a pair of links 28, 29 having pivots 29, 29. The camera track 26 is provided with two racks 30. A front view finder sliding member is shown at 31, a view finder peep sight at 32, and bed supporting side arms at 33, 33. Mounted upon the front track 26 are front support members 34, 34 having a U-formation, as shown in Fig. 2. Attached to said members 34 by means of rivets 35, 35 are swing members 36, 36, Figs. 4 and 5, having a channel formation in which is carried a lens board support member indicated generally at 37, Fig. 2, and provided with studs 38 that pass through grooves or slots 39 in said swing members 36, as shown in Fig. 5. The lens board support member 37 can be adjusted in a vertical direction and can be locked in place by clamp nuts 40, 40, Fig. 1. The swing members 36 are pivoted at the shoulder rivets 35 and are free to rotate thereon within the limits of the slots 41 in the lower end of each of the swing members 36, as shown in Fig. 5. The swing members 36 are clamped in any desired or selected position by means of the two clamp nuts 42 threaded onto studs 43, as shown in Figs. 2 and 7.

The front track 26 is held in position on the bed 25 by means of rails 44, 44, which are provided with grooves into which keys 46 of the front track member 26 fit, as shown in Fig. 7.

Referring to Figs. 2, and 4 to 7, the lens board support member, indicated generally at 37 in Figs. 2 and 7, is made up of two channeled members 66, 67, best illustrated in Figs. 6 and 7, and which may also be described as being each of general rectangular form in section across the camera, with meeting peripheral edges as shown in Fig. 6, being a section on the line 6—6 of Fig. 2. The said members 66, 67 each have the form of a rectangular frame or open square, best evident from Figs. 6 and 7.

It will be noted that in Fig. 6 there is a space provided between the inner edge of the outer channeled member 66 and the inner edge of the inner or rear channeled member 67. This provides a groove 68, shown in Fig. 7 also, into which is fitted the lens board 69. A bellows mounting plate or member is also fitted to the lens board support member 37 and is indicated at 70, Figs. 6 and 7. The channeled members 66 and 67 and the bellows mounting plate or member 70 are held together by a shoulder screw 71 and a nut 72. The channeled members 66 and 67 are suitably held apart by spacers 73. Also held to the lens board support member 37 by the shoulder screw 71 are the upper and lower lens board locking members or slide locks 74 and 74a, Fig 2, having angular slots 75 to guide the said locking members or slide locks 74 and 74a into position for locking the lens board. The locking member 74a is shown in Fig. 2 in unlocked condition and the locking member 74 is shown in Fig. 2 in locked condition. In order to put the lens board in place, the locking member 74 is moved to the left, viewing Fig. 2 and the locking member 74a is moved to the right. When the lens board is in place, the locking member 74 is moved to the right, viewing Fig. 2, and the locking member 74a is moved to the left. Due to the angularity of the slots 75, the locking members 74 and 74a will be caused to move in an inward direction, thus clamping the lens board in place.

In Fig. 2, the slide lock or locking member 74 is, as stated, shown in locked condition, and the slide lock or locking member 74a is in the unlocked condition. To the vertical walls of the lens board support member 37, formed by the channeled members 66 and 67, is attached a reinforcing member 76, shown in Fig. 7, and to the said reinforcing member 76 is attached the stud 38, Fig. 7, previously referred to. The said stud 38 passes through holes in the channeled members 66 and 67 into the grooves or slots 39 in the swing members 36 and provides means for attaching the lens board support member 37 to the swing members 36. The lens board support member 37 can be moved in a vertical direction by loosening the nuts 40, 40 and moving the entire lens board support assembly in a vertical direction within the distance established by the grooves or slots 39 and then can be held in that position by the clamp nuts 40.

In Fig. 2 is shown a metal frame view finder made up of two U-shaped members, and to which view finder this invention is particularly directed. The upper U-shaped member 31, previously referred to, collapses into a second U-shaped member 77. In Fig. 2, the view finder is shown in the erected condition for use, wherein the U-shaped member 31 has been extended, as has also the U-shaped member 77, and the peep sight member 32, previously referred to, has been placed in the erected position. The said peep sight member 32 is pivoted on a screw 32a on the camera back, as shown in Fig. 1. The construction is such that the peep sight member 32 can be rotated about the screw 32a to a folded position.

The U-shaped member 77 is of a channel formation and the U-shaped member 31 is fitted into the said channel, as most clearly shown in Fig. 4. When the U-shaped member 31 has been assembled with the U-shaped member 77, they are fitted to openings in the lens board support member 37, as most clearly shown in Fig. 2. The U-shaped member 31 is provided with a spring 78 (Fig. 3) held to the U-shaped member 31 by a rivet 79. The lower end of the spring 78 is provided with a dog 90 that engages an opening 91 of the U-shaped member 77 which is provided with an inwardly extending finger 77a that limits the motion of the U-shaped member 77 in an upward direction against a detent finger 92, two of which are provided at opposite sides of the camera. When the view finder is in the collapsed condition an upward pull on the U-shaped member 31 will cause it to move in an upward direction carrying with it the spring 78, and the latter will engage the opening 91 of the U-shaped member 77. Both U-shaped members will then be caused to move in an upward direction until stopped by the finger 77a against the corresponding detent 92. The view finder will then be in the fully opened condition.

There is provided means to adjust the view finder for parallax, it being made up of the U-shaped members 31 and 77. In the disclosed embodiment of the invention, there are employed three positions for adjustment of parallax correction and the distances selected are six feet, fifteen feet and infinity. When the view finder is in the fully erected position, it is set in the infinity position. The opening 93 will then be engaged by the corresponding detent 92. In order properly to locate the view finder in other positions, there are provided openings 94 and 95 in the U-shaped member 77. The opening 94 corresponds to the fifteen-foot setting and is indicated to the operator by the numeral 15 engraved on the U-shaped member 31, Fig. 4. The opening 95 is the six-foot position, and this position will be indicated by the numeral 6 on the U-shaped member 31, Fig. 4. As shown particularly in Fig. 3, on the U-shaped member 31 there are provided three index lines, the line 96 corresponding to the infinity position, the line 97 corresponding to the fifteen-foot position, and the line 98 corresponding to the six-foot position. The third opening 93 is provided in the U-shaped member 77 to hold the view finder in the fully erected position; that is, in the infinity position and is engaged by the corresponding detent 92 when in that position. Each detent 92 is provided with a housing 99, Figs. 3 and 7, made as a short tube and into which is fitted the corresponding detent 92, one on either side of the camera, the left one only being shown. A coil spring 100 (Fig. 7) tends to force both the detents 92 in an outward direction to engage the holes 93, 94 and 95, previously referred to on the opposite upright portions of the lower U-shaped member 77. Each tube 99 is held in position by a spring member 101, most clearly shown in Fig. 7. I may pull up the upper frame member 31, causing the detent 90 to engage in the hole 91 of the lower frame member 77, and then continue pulling the two frame members upward only until the detent 92 engages whichever hole 95 or 94 in the frame member 77 corresponds to the parallax setting to which I desire to adjust the view finder. That is, it is not necessary to pull the frame members up to the infinity position and then push them down again to whatever parallax position corresponds to the range desired.

As previously stated, the front support members 34, 34 are of a U-formation, as most clearly shown in Figs. 2 and 7. The two vertical arms 34, 34 are tied together by a cross or horizontal member 34a which has also built thereto a clamp mechanism for clamping the camera front to the front track 26.

Again referring to Fig. 7, underneath the cross member 34a is a plate 102 having downwardly extending portions on both sides of the camera and indicated at 103, 103. Fitted into a suitable hole in the plate 102 and projecting through a slot 104 of the cross member 34a is a shoulder rivet 105 having a head 106. To the lower end of the said shoulder rivet 105 is attached a clamp member 107. While only one such clamp member 107 is shown, there is one on each side of the camera. Mounted on the cross member 34a is a cam or clamp plate 108 having a lever handle 109. The cam or clamp plate 108 is provided with a shoulder screw 110 that passes through said cam or clamp plate 108 and through the plate 102, and on its lower end is fitted a nut 111. The cam or clamp plate 108 is provided with indentations or recesses 112 into which are fitted balls 113, Fig. 7. When the cam or clamp plate 108 is in the position shown in Fig. 7, the balls 113 are in the indentations 112 of the cam or clamp plate 108, and the camera will be in unclamped position, and therefore can be moved along the front track 26, but when the lever handle 109 is turned either to the right or to the left, the balls 113 will be pushed downward out of the indentations 112 of the cam or clamp plate 108 and against the clamp member 107, thus clamping the camera front to the front track 26. An opening for the balls 113 is provided in the plate 102, as most clearly shown in Fig. 7.

It is desirable, with respect to a camera with a tilted front as herein disclosed, to have means for positioning the front of the camera in parallel with the back thereof. To provide means of doing this very accurately, there is fitted into each front support member 34 (Figs. 4 and 7) a bolt having an eccentric head 114 that passes through such support members 34, the opposite end of which is provided with a nut 115. Since the head of the bolt 114 is in an eccentric position with respect to the body of the bolt when the bolt is turned, a different position will be assumed by the head of the bolt 114, thus providing means accurately to stop the swing member 36 when the correct position is found. The nut 115 is then tightened and the camera front will thus always be stopped in a direct vertical position.

Referring to Fig. 1, the side arms 33 are attached to ears 116, 116 of the camera bed 25 by means of rivets 117, 117.

Having thus described one illustrative embodiment of the invention, it is to be understood that although specific terms are employed, they are used in a generic and descriptive sense and not for purposes of limitation, the scope of the invention being set forth in the following claims.

I claim:

1. In a photographic camera having a front standard, a view finder mounted upon said standard, said view finder consisting of upper and lower, open, frame members slidingly collapsible and extensible vertically one onto the other, and both slidingly collapsible vertically into the front standard, said frame members both having vertical portions slidable up and down upon each other, the said vertical portion of one of said frame members having an opening and the said vertical portion of the other said frame members having a projection to engage said opening when brought into transverse alignment therewith, whereby, when the opening and the projection are engaged with each other provision is thus made for conjoint vertical movement of both frame members in setting the view finder for use, the lower one of said frame members, in addition, having at least two openings vertically spaced from each other for correcting for parallax, and the said front standard having a movable projection to enter either one of said openings provided upon such lower frame member, for correcting for parallax according to the distance of the camera from the object.

2. In a photographic camera having a front standard, a view finder mounted upon said standard, said view finder consisting of upper and lower, open, frame members slidingly collapsible and extensible vertically one into the other, and both slidingly collapsible vertically into the front standard, one of said frame members for the purpose of rendering the view finder collapsible and extensible being provided with an opening at an upwardly extending portion thereof, and the other frame member having a spring provided with a projecting formation adapted, as the view finder is drawn upward into operable position, to enter said opening in the other member, so that in the further setting movement of the view finder for use, the two frame members move as a unit, said lower frame member having a series of openings spaced for parallax correction lengthwise along an upwardly extending portion thereof, and a movable member carried by the front standard to engage any one of said openings according to the distance of the object to be photographed, from the camera.

3. In a photographic camera having a front standard, a view finder mounted upon said standard, said view finder consisting of upper and lower, open, frame members slidingly collapsible and extensible vertically one into the other, and both slidingly collapsible vertically into the front standard, the upper frame member being provided with a spring having a projecting formation and the lower frame member having an opening to be engaged by said projecting formation, said lower frame member having a series of openings spaced for parallax correction lengthwise along an upwardly extending portion thereof and a movable member carried by the front standard to engage any one of said openings, according to the distance of the object to be photographed from the camera.

4. In a photographic camera having a front standard, a view finder mounted upon said standard, said view finder consisting of upper and lower, open, frame members slidingly collapsible and extensible vertically one onto the other, and both slidingly collapsible vertically into the front standard, said view finder, for the purpose of correcting for parallax, having one of said frame members provided with a series of longitudinally spaced openings which are spaced for parallax correction along an upwardly extending portion thereof, and the front standard being provided with a spring pressed detent to engage any one of said longitudinally spaced openings.

5. In a photographic camera having a front standard, a view finder mounted upon said standard, said view finder consisting of upper and lower, open, frame members slidingly collapsible and extensible vertically one onto the other, and both slidingly collapsible vertically into the front standard, said view finder, for the purpose of correcting for parallax, having one of said frame members provided with a series of longitudinally spaced openings which are spaced for parallax correction along an upwardly extending portion thereof, and the front standard being provided with a spring pressed detent to engage any one of said longitudinally spaced openings, the frame member that is provided with the series of longitudinally spaced openings being also provided with another opening below said series of openings and the other frame member being provided with a spring having a projecting formation adapted, as the view finder is drawn upward into operable position, to enter said lowest opening, so that in the further setting movement of the view finder for use, the two frame members move as a unit.

6. In a photographic camera having camera-front supporting means, a view finder mounted upon the said camera-front supporting means, said view finder comprising an upper, inverted U-shaped member and a lower inverted U-shaped member, each complete in itself to constitute an inverted U-shaped member, each member thus presenting two vertical legs, the legs of said members having a vertically telescoping relation with respect to each other, and also movable together, to a limited extent, at least one of said legs of one of said members having at least three openings vertically spaced along its length, at least two of such three openings above the lowermost opening being for the purpose of correcting for parallax, the corresponding leg of the other of said members having a spring with a projecting formation to engage said lowermost opening, so that when so engaged the view finder may be drawn up into fully opened condition, and movable means upon said camera-front supporting means to engage any one of the said openings provided for parallax correction upon sufficient relative movement of the view finder from its fully opened position.

7. In a photographic camera having camera-front supporting means, a view finder mounted upon the said camera-front supporting means, said view finder comprising an upper, inverted U-shaped member and a lower, inverted U-shaped member, each complete in itself to constitute an inverted U-shaped member, each member thus presenting two vertical legs, the legs of said members having a vertically telescoping relation with respect to each other, and also movable together, to a limited extent, at least one of said legs of one of said members having at least three openings vertically spaced along its length, at least two of such three openings above the lowermost opening being for the purpose of correcting for parallax, the corresponding leg of the other of said members having a spring with a projecting formation to engage said lowermost opening, so that when so engaged the view finder may be drawn up into fully opened condition, and a spring-pressed horizontally-movable detent mounted in the camera-front supporting means, to engage any one of the openings provided for parallax correction.

8. In a photographic camera having a front standard, a view finder mounted upon said standard, said view finder consisting of upper and lower, open, frame members slidingly collapsible and extensible vertically one onto the other, and both slidingly collapsible vertically into the front standard, wherein an upward pull upon the upper frame member will cause it to move in an upward direction, cooperating formations upon said two frame members respectively that automatically engage each other when the upper frame member has been pulled upwardly to a predetermined extent, so that upon continued upward pull upon the upper frame member, both members will move upward together until the said view finder is in fully opened, operable condition, and interengageable, cooperating formations upon the lower of said frame members and the front standard, for correcting for parallax, the formations for such latter purpose upon the lower of said frame members being located higher than the formation on said lower frame member that engages the formations upon the upper of said frame members when the two frame members are moved together into fully opened, operable condition, whereby to correct for parallax both of said frame members are moved relatively until the desired parallex-correcting formation is engaged.

9. In a photographic camera having a front standard, a view finder mounted upon said standard, said view finder consisting of upper and lower, open, frame members slidingly collapsible and extensible vertically one into the other, and both slidingly collapsible vertically into the front standard, one of said frame members for the purpose of rendering the view finder collapsible and extensible being provided with an opening at an upwardly extending portion thereof, and the other frame member having a spring provided with a projecting formation adapted, as the view finder is drawn upward into operable position, to enter said opening in the other member, so that in the further setting movement of the view finder for use, the two frame members move as a unit, said lower frame member having a series of openings spaced for parallax correction lengthwise along an upwardly extending portion thereof, and a spring-pressed detent mounted in a horizontal position upon the front standard to engage any one of said openings, according to the distance of the object to be photographed, from the camera.

10. A view finder for a photographic camera in accordance with claim 5, but wherein the frame member that is provided with the series of longitudinally spaced openings is the lower frame member, and wherein the frame member that is provided with a spring having a projecting formation is the upper frame member.

11. A view finder for a photographic camera in accordance with claim 2, but wherein it is the upper of said frame members that has a spring provided with a projecting formation and it is the lower of said frame members that has an opening to be engaged by the said projecting formation of such spring.

12. In a photographic camera having camera-front supporting means, a view finder mounted upon the said camera-front supporting means, said view finder comprising an upper, inverted U-shaped member and a lower inverted U-shaped member, each complete in itself to constitute an inverted U-shaped member, each member thus presenting two vertical legs, the legs of said members having a vertically telescoping relation with respect to each other, and also movable together, to a limited extent, the legs of at least one pair of telescoping legs of said two members having respectively an opening and a dog to engage said opening, so that when so engaged and the upper of said two members is pulled sufficiently upward, the two members move upward together into fully extended position, one of said two members and the camera-front supporting means having respectively a series of vertically aligned openings and a detent movable to engage whichever one of said series of vertically aligned openings corresponds to the proper parallax setting to which the view finder should be adjusted to establish correction for parallax according to the distance of the object from the camera.

OSCAR STEINER.

REFERENCES CITED

The following references are of record in the file of this patent:

UNITED STATES PATENTS

| Number | Name | Date |
|---|---|---|
| 753,800 | Locke | Mar. 1, 1904 |
| 970,443 | Hammond | Sept. 13, 1910 |
| 1,239,469 | Dietz | Sept. 11, 1917 |
| 1,684,821 | Eastman | Sept. 18, 1928 |
| 1,833,459 | Green | Nov. 24, 1931 |
| 1,886,951 | Gutermuth | Nov. 8, 1932 |
| 2,211,995 | Walker | Aug. 20, 1940 |
| 2,233,352 | Steiner | Feb. 25, 1941 |
| 2,264,777 | Steiner | Dec. 2, 1941 |
| 2,282,263 | Steiner | May 5, 1942 |
| 2,293,598 | Drucker | Aug. 18, 1942 |
| 2,319,681 | Heckethorn | May 18, 1943 |
| 2,327,859 | Bolsey | Aug. 24, 1943 |

FOREIGN PATENTS

| Number | Country | Date |
|---|---|---|
| 341,858 | Germany | Oct. 10, 1921 |